(12) United States Patent
Roberts et al.

(10) Patent No.: US 12,306,868 B2
(45) Date of Patent: May 20, 2025

(54) SYSTEMS AND METHODS FOR ESTABLISHING AN ITINERARY BASED ON MULTIMEDIA CONTENT OF INTEREST

(71) Applicant: Discovery.com, LLC, New York, NY (US)

(72) Inventors: Brian F. Roberts, Dallas, TX (US); Chad Peltola, Fairfield, CT (US); Jill Mulligan, Greenwich, CT (US); Charles Robertson, Seattle, WA (US); Kyle Jackson, New York, NY (US); Enrique Florendo, Westlake Village, CO (US)

(73) Assignee: Discovery.com, LLC, New York, NY (US)

(*) Notice: Subject to any disclaimer, the term of this patent is extended or adjusted under 35 U.S.C. 154(b) by 0 days.

(21) Appl. No.: 18/486,743

(22) Filed: Oct. 13, 2023

(65) Prior Publication Data
US 2024/0119085 A1    Apr. 11, 2024

Related U.S. Application Data

(63) Continuation of application No. 17/936,667, filed on Sep. 29, 2022, now Pat. No. 11,822,593.

(51) Int. Cl.
*G06F 15/16* (2006.01)
*G06F 16/483* (2019.01)
*G06Q 10/02* (2012.01)

(52) U.S. Cl.
CPC ........... *G06F 16/483* (2019.01); *G06Q 10/02* (2013.01)

(58) Field of Classification Search
CPC .............................. G06F 16/483; G06Q 10/02
See application file for complete search history.

(56) References Cited

U.S. PATENT DOCUMENTS

| | | |
|---|---|---|
| 6,629,136 B1 | 9/2003 | Naidoo |
| 7,925,540 B1 | 4/2011 | Orttung et al. |
| 9,918,199 B2 | 3/2018 | Rouda, Jr. |
| 10,140,083 B1* | 11/2018 | Nguyen ............... G11B 27/031 |
| 10,489,496 B1* | 11/2019 | Sen .................... H04N 21/4122 |
| 2003/0140088 A1 | 7/2003 | Robinson et al. |
| 2009/0106662 A1* | 4/2009 | Ye .......................... G06F 9/452 |
| | | 715/740 |
| 2012/0260289 A1 | 10/2012 | Napigkit |
| 2013/0268302 A1 | 10/2013 | Jayaram |

(Continued)

*Primary Examiner* — John B Walsh
(74) *Attorney, Agent, or Firm* — Bookoff McAndrews, PLLC (57) ABSTRACT

Systems and methods for constructing an itinerary for a user based on articles of multimedia content are disclosed. One computer-implemented method may include: receiving, at the server and from a user device hosting a media streaming platform, an indication of selection by a user of a travel option associated with an aspect featured in an article of multimedia content presented on the media streaming platform; identifying, based on the receiving, a real-world location of the aspect; ascertaining, by the server, contextual information associated with the user; establishing, based on the real-world location of the aspect and the contextual information associated with the user, the itinerary for travel to the aspect; and presenting, subsequent to the establishing, a visual display of the itinerary on the media-streaming platform. Other aspects are described and claimed.

20 Claims, 7 Drawing Sheets

(56) References Cited

U.S. PATENT DOCUMENTS

| | | | |
|---|---|---|---|
| 2014/0222912 A1* | 8/2014 | St. Clair | H04L 67/535 |
| | | | 709/204 |
| 2016/0006823 A1 | 1/2016 | Strong et al. | |
| 2016/0094943 A1 | 3/2016 | Cao | |
| 2019/0171341 A1* | 6/2019 | Eubanks | H04N 21/43076 |
| 2020/0110519 A1 | 4/2020 | Vangala et al. | |
| 2022/0335476 A1 | 10/2022 | Abdel-Wahab et al. | |
| 2023/0418062 A1* | 12/2023 | Wawruch | G06F 3/04847 |

* cited by examiner

SYSTEMS AND METHODS FOR ESTABLISHING AN ITINERARY BASED ON MULTIMEDIA CONTENT OF INTEREST

CROSS-REFERENCE TO RELATED APPLICATION(S)

This patent application is a continuation of and claims the benefit of priority to U.S. Nonprovisional patent application Ser. No. 17/936,667, filed on Sep. 29, 2022, the entirety of which is incorporated herein by reference.

TECHNICAL FIELD

Various embodiments of the present disclosure relate generally to the field of digital assistants, and, more particularly, to a digital assistant configured to optimize travel based on a user's multimedia content preferences.

BACKGROUND

Many individuals travel to various locations around the world (e.g., for leisure, for work, etc.) and may want to visit certain attractions that are of interest to them at these destinations. For instance, consumers of multimedia content (e.g., provided by a subscription-based media streaming platform) may be interested in visiting places (e.g., buildings, areas, etc.), seeing objects (e.g., statues, structures, etc.), and/or partaking in experiences (e.g., food and/or beverage tasting, etc.) that are featured in their favorite shows, films, documentaries, etc. The present disclosure is accordingly directed to optimizing an individual's travel experience by incorporating aspects of their favorite articles of multimedia content in the trip.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for enabling users to plan trips and optimize experiences on those trips based around aspects of their favorite article of multimedia content.

In one aspect, a method of establishing an itinerary using a server in network communication with at least one database is disclosed, the method comprising operations including: receiving, at the server and from a user device hosting a media streaming platform, an indication of selection by a user of a travel option associated with an aspect featured in an article of multimedia content presented on the media streaming platform; identifying, based on the receiving, a real-world location of the aspect; ascertaining, by the server, contextual information associated with the user; establishing, based on the real-world location of the aspect and the contextual information associated with the user, the itinerary for travel to the aspect; and presenting, subsequent to the establishing, a visual display of the itinerary on the media-streaming platform.

In another aspect, a system for establishing an itinerary is disclosed, the system comprising: at least on processor; at least one database; and a server in network communication with the at least one database, the server configured to perform operations including: receiving, at the server and from a user device hosting a media streaming platform, an indication of selection by a user of a travel option associated with an aspect featured in an article of multimedia content presented on the media streaming platform; identifying, based on the receiving, a real-world location of the aspect; ascertaining, by the server, contextual information associated with the user; establishing, based on the real-world location of the aspect and the contextual information associated with the user, the itinerary for travel to the aspect; and presenting, subsequent to the establishing, a visual display of the itinerary on the media-streaming platform.

In yet another aspect, a method of optimizing travel using a server in network communication with at least one database is disclosed, the method comprising operations including: receiving, at the server, an indication of a geographic location associated with a user; determining, using the server, at least one article of multimedia content present on a media streaming platform that features an aspect associated with the geographic location; constructing, based on the determining, a content rail comprising the at least one article of multimedia content; and presenting, on the media streaming platform, the content rail.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

The term "user", "subscriber," and the like generally encompasses consumers who are subscribed to a streaming service (e.g., streaming platform) associated with the system described herein. The term "streaming service" (e.g., streaming platform) may refer to subscription-based video-on-demand (SVoD) services such as television shows, films, documentaries, and the like. The term "user" may be used interchangeably with "user profile," "profile," and the like throughout this application. The phrase "registered with" may be used interchangeably with "subscribed to" and the like throughout this application. The phrase "multimedia content" may be used interchangeably with "multimedia content item", "article of multimedia content", and the like throughout this application.

In the following description, embodiments will be described with reference to the accompanying drawings. As will be discussed in more detail below, in various embodiments, systems and methods for providing dynamic, location-based notifications to a user are described.

Multimedia content may feature a variety of different types of objects and places from around the world. For example, reality shows (e.g., travel shows, food-based review shows, home makeover shows, other types of reality shows, etc.), documentaries, sports broadcasts, music videos, and the like may highlight various buildings, businesses, sculptures, things, and the like. Some individuals, especially enthusiasts, or "fans", of some articles of multimedia content may be interested in visiting some of these multimedia content-affiliated places in-person (e.g., as part of a dedicated trip, as a side attraction from another trip, etc.).

Conventional media streaming platforms are lacking in their ability to enable individuals to plan and/or optimize a trip based upon their favorite articles of multimedia content. For instance, the location (e.g., city/state, etc.) of a restaurant may be identified in a show but no further options or information may be available that allow an individual to easily incorporate that restaurant into part of their trip. In this situation, an individual may need to take many extra steps to find out the best way to travel to that restaurant, which may be time-consuming and/or burdensome. Additionally, these conventional platforms are static in their content presentation and don't evolve to adapt to the locations that the individual's visit, thereby contributing little to an individual's travel experience.

To address the above-noted problems, the present disclosure describes a system that may dynamically establish a travel itinerary for a user based on aspects of an article of multimedia content that they are interested in. More particularly, the system may receive an indication of selection of a travel option associated with an aspect featured in an article of multimedia content presented on a media streaming platform. The system may then identify a real-world location associated with the aspect and ascertain certain contextual information associated with the user. Thereafter, the system may establish an itinerary for travel to the real-world location associated with the aspect in consideration of the contextual information.

The present disclosure further provides a system that may optimize a user's travel experience by curating media content that is associated with their geographic location. More particularly, the system may receive an indication of a geographic location that is associated with a user. The system may further identify one or more articles of multimedia content that are associated with the user's geographic location. Thereafter, the system may assemble a content rail containing the foregoing geographically-associated articles of multimedia content and may then present that content rail to the user.

Although the subject matter disclosed herein is generally described with reference to a user's favorite articles of multimedia content, it is important to note that these designations are not limiting. More particularly, some or all of the embodiments that are subsequently described may be applicable to other areas of user interest (e.g., art, books, nature, etc.).

Figure 1:
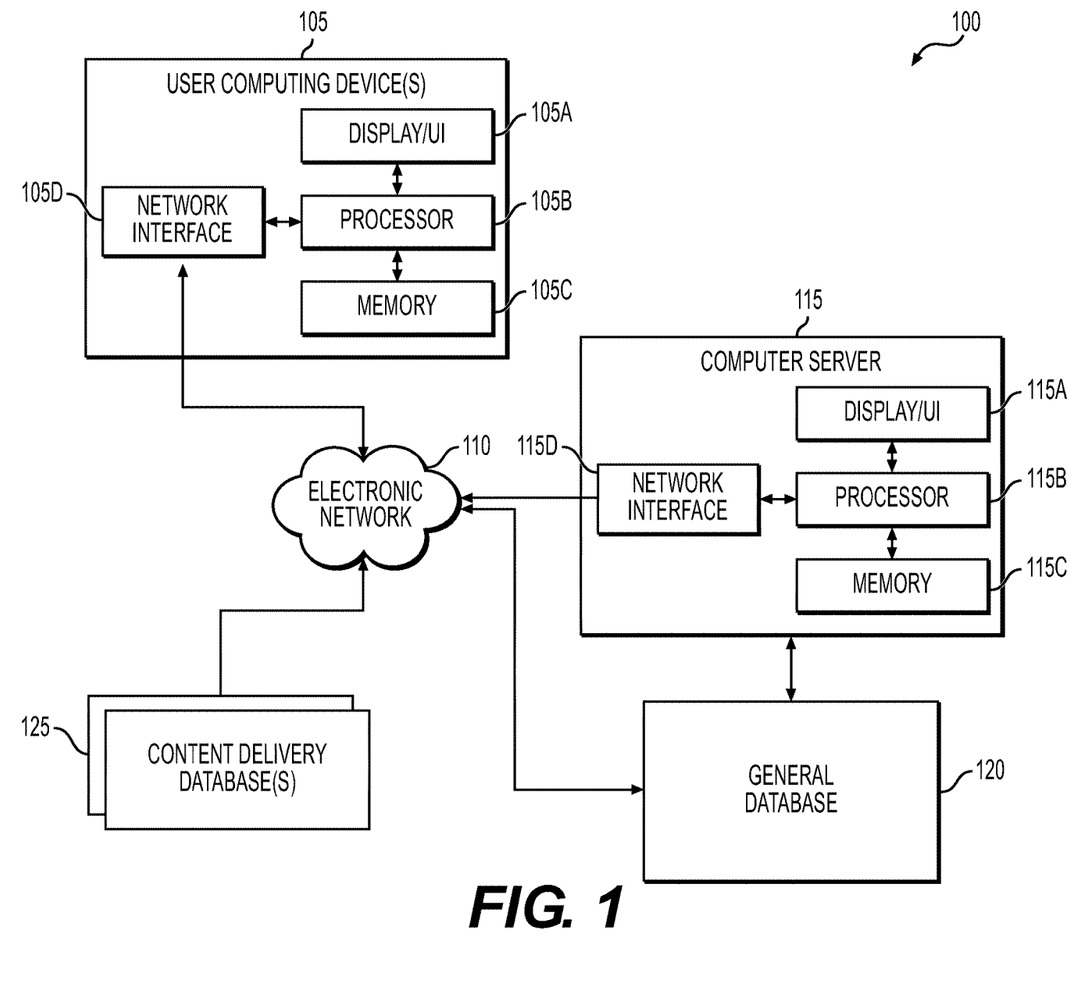
FIG. 1 depicts an exemplary system infrastructure, according to one or more embodiments.

FIG. 1 depicts an exemplary block diagram of a system environment 100 configured to establish an itinerary for a user based on their multimedia interests, according to one or more embodiments of the present disclosure. The system environment 100 may include a user computing device 105 operated by a user, an electronic network 110, a computer server 115, a general database 120, and one or more content delivery databases 125.

The user computing device 105, the server 115, the general database 120 and/or the content delivery databases 125 may be connected via the network 110, using one or more standard communication protocols. The server 115 may be configured to receive data over the network 110 from the user computing device 105, including, but not limited to, user-associated context data, device-based location data, and location data associated with aspects featured in the articles of multimedia content. Each of the foregoing types of data may be stored in the general database 120, and may include information as to: travel characteristics associated with the user (e.g., travel means, travel budget, travel preferences, etc.), a history of geographic locations previously visited by the user computer device 105, and geographic information associated with the aforementioned aspects.

In one or more embodiments, the computer server 115 and the general database 120 may be one server computer device and a single database, respectively. Alternatively, in one or more embodiments, the server 115 may be a server cluster, or any other collection or network of a plurality of computer servers. The general database 120 also may be a collection of a plurality of interconnected databases. The server 115 and the general database 120 may be components of one server system. Additionally, or alternatively, the server 115 and the general database 120 may be components of different server systems, with the network 110 serving as the communication channel between them. The computer server 115, the general database 120, and/or the content delivery databases 125 may be associated with an entity 130, such as a subscription-based streaming service provider (not shown). In some embodiments, the computer server 115, the general database 120, and/or the content delivery databases 125 may collectively be referred to as an entity system.

As shown in FIG. 1, the computer server 115 may be in communication with the user device 105 to transmit and receive data, messages, and/or instructions from each other across the network 110. The user device 105 may be associated with a user that is subscribed to a streaming service platform provided by the computer server 115. The network 110 may comprise one or more networks that connect devices and/or components of environment 100 to allow communication between the user device 105, the computer server 115, and other associated components. For example, the network 110 may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of environment 100. In some embodiments, the network 110 may be implemented using cell and/or pager networks, satellite, licensed radio, or a combination of licensed and unlicensed radio. The network 110 may be associated with a cloud platform that stores data and information related to methods disclosed herein.

The user computing device 105 may include a display/user interface (UI) 105A, a processor 105B, a memory 105C, and/or a network interface 105D. The user computing device 105 may be a personal computer (PC), a tablet PC, a set-top box (STB), a streaming device (e.g., Apple TV®, Amazon Fire®, Roku® player, Google Chromecast®), a television (TV), a smart TV, a gaming console, a personal digital assistant (PDA), a mobile device, a palmtop computer, a laptop computer, a desktop computer, etc. The user computing device 105 may execute, by the processor 105B, an operating system (O/S) and at least one application (each stored in memory 105C). The application may be a browser program or a mobile application program (which may also be a browser program in a mobile O/S). The application may be able to establish an itinerary for a user for travel to an aspect featured in an article of multimedia content based on instructions/information received from the server 115. In some embodiments, the application may establish the itinerary based on instructions/information stored in the memory 105C. The itinerary may be a visual itinerary presented on the application GUI and may be executed based on XML and Android programming languages or Objective-C/Swift. However, one skilled in the art would recognize that this may also be accomplished by other methods, such as webpages executed based on HTML, CSS, and/or scripts, such as JavaScript. The display/UI 105A may be a touch screen or a display with other input systems (e.g., mouse, keyboard, etc.). The network interface 105D may be a TCP/IP network interface for, e.g., Ethernet or wireless communications with the network 110. The processor 105B, while executing the application, may receive user inputs from the display/UI 105A, and perform actions or functions in accordance with the application or other related applications.

The computer server 115 may include a display/UI 115A, a processor 115B, a memory 115C, and/or a network interface 115D. The server 115 may be a computer, system of computers (e.g., rack server(s)), and/or or a cloud service computer system. The server 115 may execute, by the processor 115B, an operating system (O/S) and at least one instance of a server program (each stored in memory 115C). The server 115 may store or have access to information from the general database 120 and content delivery databases 125. The display/UI 115A may be a touch screen or a display with other input systems (e.g., mouse, keyboard, etc.) for an operator of the server 115 to control the functions of the server 115 (e.g., update the server program and/or the server information). The network interface 115D may be a TCP/IP network interface for, e.g., Ethernet or wireless communications with the network 110. The server program, executed by the processor 115B on the server 115, may be configured to identify interaction partners that align with a user's mission(s) of interest, as will be described in further detail below.

As described above, the computer server 115 may store data associated with users subscribed to a streaming service platform associated with the computer server 115. For instance, the computer sever 115 may store user profiles generated by the computer server 115 for the user. In some embodiments, the information described above, including the data stored in the general database 120 and any additional data received from the user computing device 105, may be stored in a plurality of user profiles within the interaction database 120. Each user profile may correspond to a specific user in communication with the server 115. In an embodiment, a user may have multiple user computing devices 105 registered with the server 115 based on the user's viewing habits and/or preferences. For example, one user may register a personal laptop, a smart TV, and a mobile device with the server 115. Information associated with registered user computing device(s) 105 and the user's viewing habits and/or viewing preferences may all be stored within the user's user profile.

In some embodiments, each user profile may also include information associated with a respective user and their user computing device(s) 105 (e.g., a device identifier, device type), the user's name, a username or a nickname provided by the user for the user profile, content viewing preferences provided by the user, recommendations provided to the user by the computer server 115, the user's past viewing activity, IP addresses and locations (as well as accompanying dates and times) from where the user has logged in from, and/or user analytics generated by the server 115. In these embodiments, the user profile may be updated to reflect a corresponding user's recent activities and locations.

In the system environment 100, the computer server 115, in association with a multimedia streaming platform, may retrieve multimedia content requested by users from the content delivery databases 125 to enable requested content to be streamed by users on the user computing device 105. The content delivery database 125 may store volumes of multimedia content items, including, for example, video series, movies, documentaries, and additional programming content that may be streamed by users 102 on the user computing devices 105. In some embodiments, the content delivery databases 125 may be maintained by third party content providers. In other embodiments, the content delivery databases 125 may be maintained by the server 115 and/or additional servers associated with the server 115. In an embodiment, the computer server 115 may analyze the articles of multimedia content stored in the content delivery database(s) 125 in order to glean various aspects associated with those articles (e.g., filming location, structures featured in the article, characters/actors/individuals featured in the articles, etc.).

In some embodiments, the computer server 115 may also store additional data received from user computing device 105, including real time and/or near real time location data (e.g., GPS data) of the user computing device 105. Based on knowledge of this location data, the computer server 115 may access information stored in the general database 120 to identify correlations between aspects of articles of multimedia content stored in the general database 120 and a user's current location. The computer server 115 may then transmit instructions, via the network 110, to the user computing device to display a notification informing the user of these correlations. In some embodiments, the computer server 115 may further facilitate access to third party websites or services responsive to user interactions with these notifications (e.g., presentation of advertisements for stores associated with the user's identified geographic location, etc.).

Figure 2:
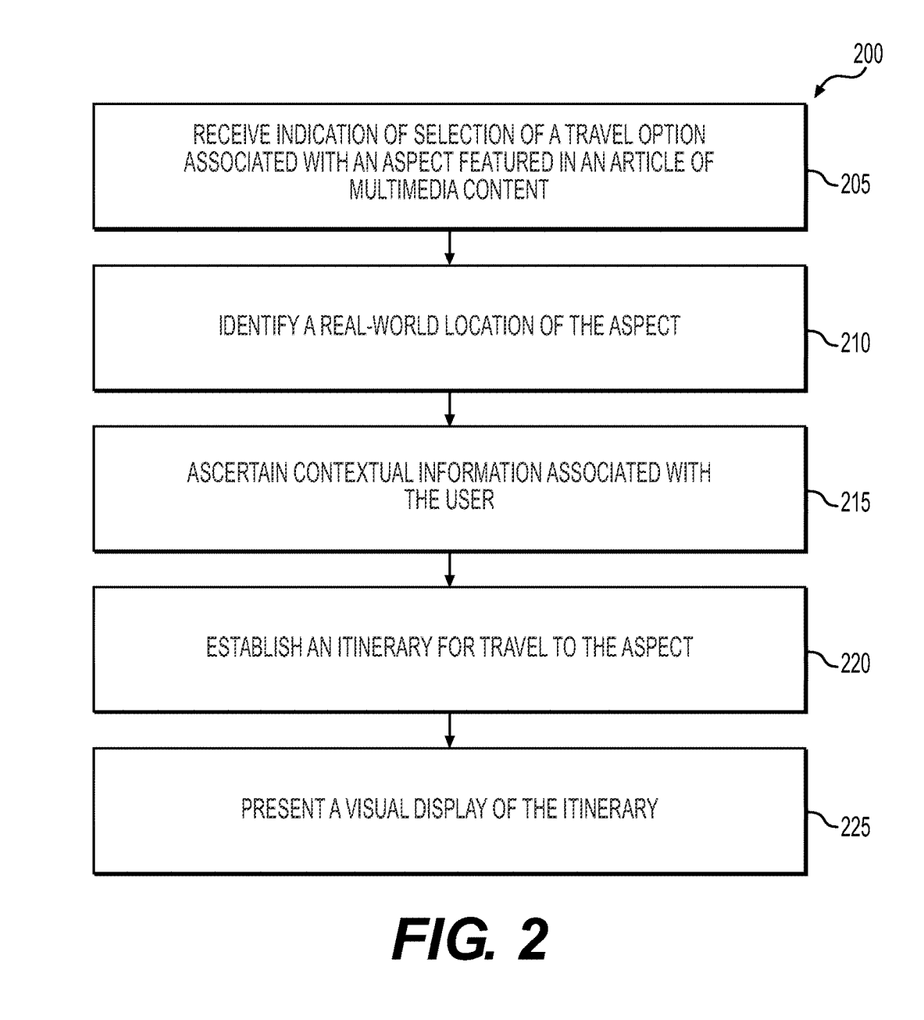
FIG. 2 depicts an exemplary flowchart of a method of establishing an itinerary for a user based on their multimedia content interests, according to one or more embodiments.

FIG. 2 depicts an exemplary process flow 200 for establishing a travel itinerary for a user with respect to an aspect associated with an article of multimedia content, according to one or more embodiments of the present disclosure. The exemplary process flow 200 may be implemented by system environment 100, which includes user computing device 105, computer server 115, general database 120, and content delivery databases 125 (all shown in FIG. 1).

At step 205, the computer server 115 may receive an indication that a user has selected a travel option associated with an aspect featured in an article of multimedia content. In the context of this application, the article of multimedia content may be one or more of: an entire series, an episode in a series, a film, a documentary, a live broadcast, and/or virtually any other type of visual media that is able to be presented on the media streaming platform. In the context of this application, an "aspect" may correspond to one or more of: a location where the article of multimedia content was filmed, a building that the article of multimedia content was filmed in, a structure featured or mentioned in the article of multimedia content, an object featured or mentioned in the article of multimedia content interest. In the context of this application, a "travel option" may correspond to a means by which a user may indicate their desire to travel from their current or upcoming geographic location to a location associated with the aspect. For example, the travel option may be one or more of: a digital button presented on a portion of the media streaming platform, a predetermined word or phrase that may be detected from audible input provided by the user, and the like. For simplicity purposes, the remainder of this disclosure is described with reference to a digital button that is presented on a media streaming platform as the travel option. However, it is important to note that such a designation is not limiting and other implementations of the travel option may be utilized.

Figure 3:
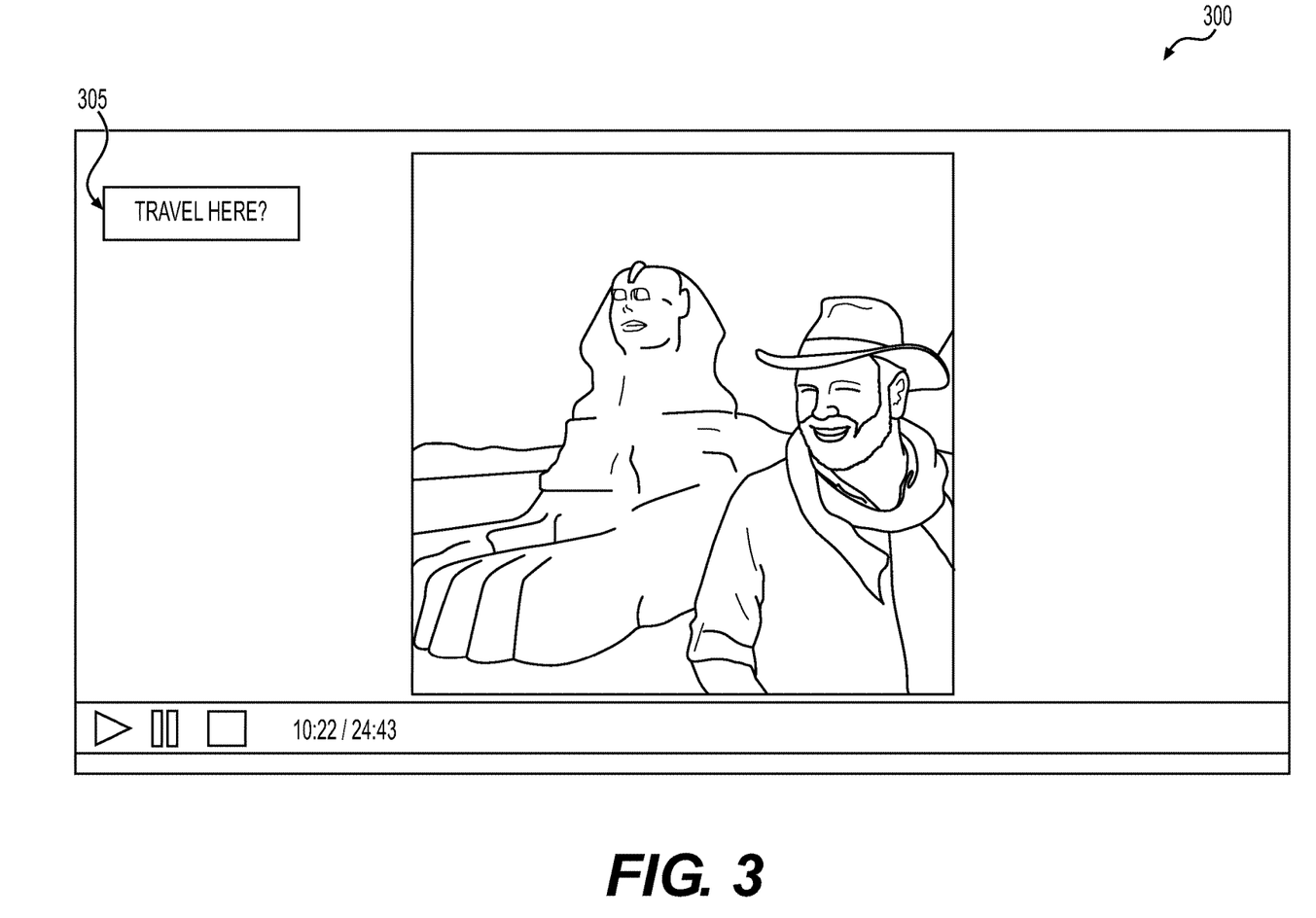
FIG. 3 depicts an exemplary GUI of a media streaming platform, according to one or more embodiments

Referring now to FIG. 3, an exemplary illustration of a GUI 300 of a media streaming platform having a travel option is provided. In an embodiment, the travel option 305 may be a digital button that is provided on a portion of the GUI (e.g., offset from the player window, etc.) of the media streaming platform. Alternatively, in another embodiment, the travel option 305 may be presented in a popup overlay (i.e., a dedicated popup window) within the media streaming platform. In an embodiment, the digital button may be permanently resident on the media streaming platform. More particularly, the digital button may be viewable and selectable by a user during the entirety of a playing duration of an article of multimedia content. Alternatively, in another embodiment, the digital button may be hidden, or made unselectable (e.g., by being "grayed out"), to the user until an aspect is detected. In response to this detection, the computer server 115 may dynamically display the digital button to the user until the aspect is no longer present in the multimedia article and/or is no longer the focus of the scene or plot. For instance, in FIG. 3, the travel option 305 may be presented on the screen for as long as a segment about the Sphinx is featured. In an embodiment, an indication may be provided, within the digital button, of a location of travel (e.g., "Travel to the Sphinx?", "Travel to Egypt", etc.).

Figure 4:
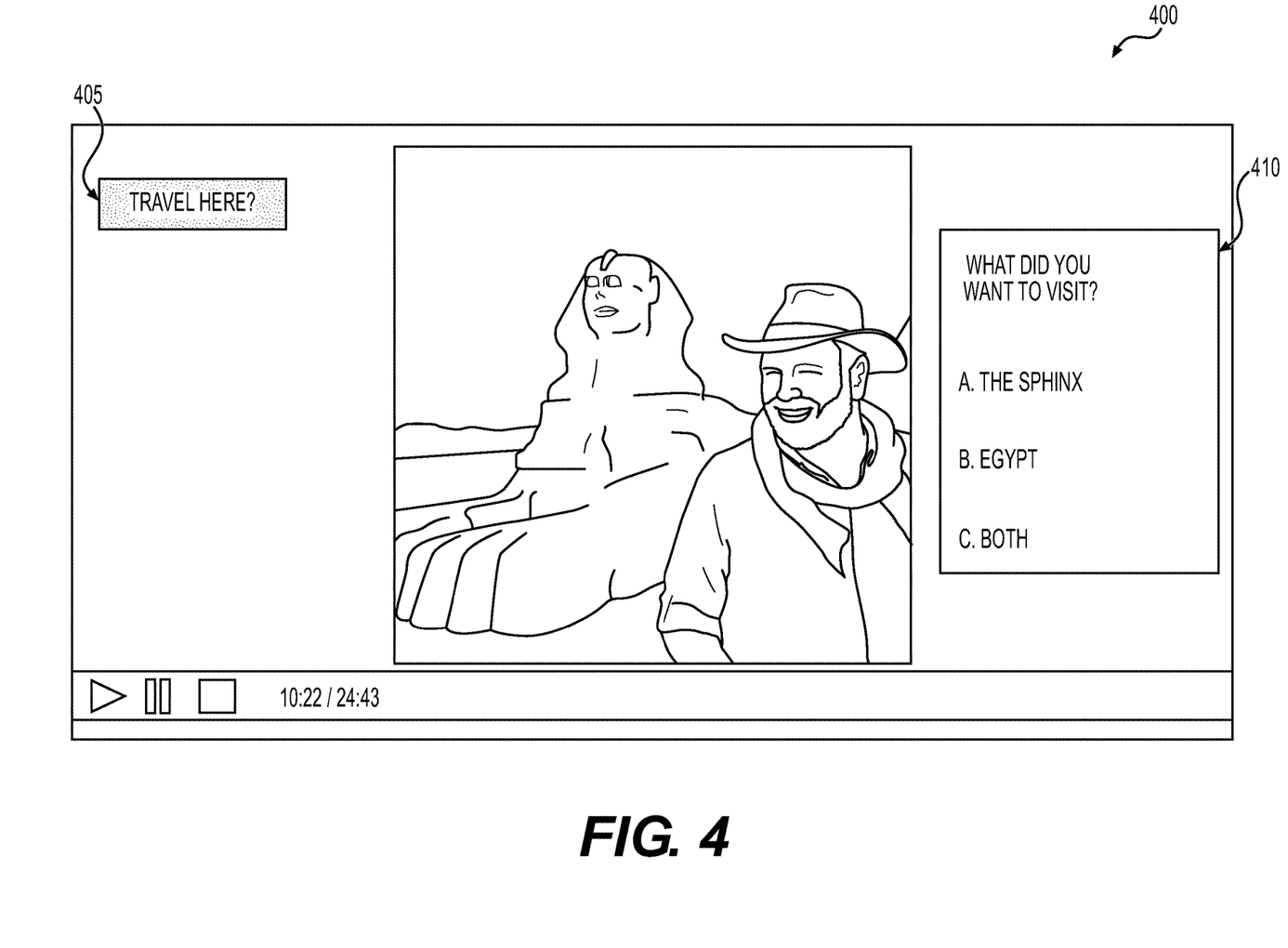
FIG. 4 depicts another exemplary GUI of a media streaming platform, according to one or more embodiments.

Referring back to FIG. 2 and with continued reference to step 205, in response to detection of selection of the travel option, the computer server 115 may attempt to identify the aspect that the user desires to travel to. More particularly, in an embodiment, if the computer server 115 only identifies one aspect, then the process may proceed to step 210, which is further described below. Alternatively, in another embodiment, if the computer server 115 identifies two or more possible aspects that the user may be referring to, the computer server 115 may generate and present a notification to the user (e.g., an audible and/or visual notification via the media streaming platform). In an embodiment, the notification may query the user to select at least one aspect from two or more listed aspects in the notification. For example, and with reference to FIG. 4, upon detection that a digital button 405 associated with the travel option is selected, a computer server 115 may identify: A) a specific structure (e.g., the Sphinx) featured in a current scene of the multimedia article; and B) a geographic location where the majority of the multimedia article was filmed (e.g., Egypt). The computer server 115 may thereafter cause a notification 410 to be presented to the user, querying them about which aspect they are interested in traveling to. The user may thereafter interact with the notification to select either one of both of the aspects.

At step 210, a real-world location of the aspect may be identified by the computer server 115. In this regard. In an embodiment, the computer server 115 may access a database that comprises associations between aspects that are featured in articles of multimedia content available to the media streaming platform and their corresponding geographic locations. Additionally or alternatively, if a geographic location for a featured aspect is not contained in the database, the computer server 115 may identify by, for example, accessing a third party source (e.g., by obtaining the information from an online source such as a web site, etc.).

At step 215, contextual information associated with the user of the media streaming platform may be ascertained by the computer server 115. In the context of this application, "contextual information" may correspond to virtually any type of travel-related information associated with the user. For example, contextual information may correspond to one or more of: a user's current geographic location, a user's upcoming geographic location (e.g., as indicated by designations made in a user's calendaring application, social media posts, and/or communications to others), a user's travel means (e.g., the type of vehicle owned and/or available for use by the user, the user's ability to utilize public transport, the user's proximity to an airport, etc.), a user's travel tendencies (e.g., a user's preferences to drive over fly, etc.), a user's upcoming scheduled plans (e.g., future work trips, future vacations, etc.), and the like. In an embodiment, the user may delineate in the media streaming platform the type of contextual information that may be accessible by the computer server 115.

At step 220, the computer server 115 may establish an itinerary for travel to the aspect based on the real-world location of the aspect and the contextual information associated with the user. More particularly, the computer server 115 may identify a current geographic location associated with the user (i.e., as delineated in the contextual information), a real-world location of the aspect (i.e., as determined by the computer server 115), and thereafter construct a plan for the user to travel from their current geographic location to the real-world location of the aspect. This plan may include an identification of the costs associated with the travel, the lodging associated with the travel, the means by which the user will travel to the aspects, the dates that the user will be traveling, and all of the costs associated with the foregoing.

In an embodiment, the construction of the itinerary by the computer server 115 may be dictated by one or more user-controlled variables. For instance, in an embodiment, the computer server 115 may be configured to construct the itinerary based on a user's available travel means and/or budget. In a situation where the computer server 115 is unable to identify a route that falls within the user's budget (i.e. because the user's budget is too low to accommodate the cheapest travel means to the aspect), then the computer server 115 may generate the next cheapest travel option. In another embodiment, the computer server 115 may be configured to construct the itinerary based on a cost-irrespective metric, such as a shortest travel distance and/or a fastest travel time. Such considerations may be further refined in view of a user's travel preferences (e.g., the fastest travel time by car only, etc.). In yet another embodiment, the computer server 115 may be configured to account for a user's upcoming scheduled events (e.g., as identified in a user's personal calendar) and construct the route so that no interference or conflict exists between their travels and a start time of the scheduled event(s).

Embodiments may exist in which the computer server 115 may be configured to plan travel to a plurality of aspects. For instance, a user of the media streaming platform may utilize the travel option to save aspects from different articles of multimedia content that they would eventually want to travel to. As an example, a user may be interested in traveling to: a specific building featured in a movie, a structure presented in an episode of a show, and a restaurant featured in another episode of the same show, all in one trip. When desired, the user may prompt the computer server 115 to construct an itinerary for travel to each of the aspects using some or all of the foregoing itinerary construction considerations.

At step 225, the computer server 115 may be configured to present a visual display of the constructed itinerary on the media streaming platform. In an embodiment, the visual display may show the planned route of travel to the aspect and/or other types of travel-related information (e.g., the travel means that the user may utilize along different portions of the trip, the travel cost, etc.). In an embodiment, a user may be able to share the constructed itinerary with another user. For example, the user may be able to send the constructed itinerary to one of their friends or social contacts on the media-streaming platform. In this regard, upon receiving a share request, the computer server 115 may identify a user profile of an intended recipient and thereafter transmit a copy of the itinerary to their user profile.

Figure 5:
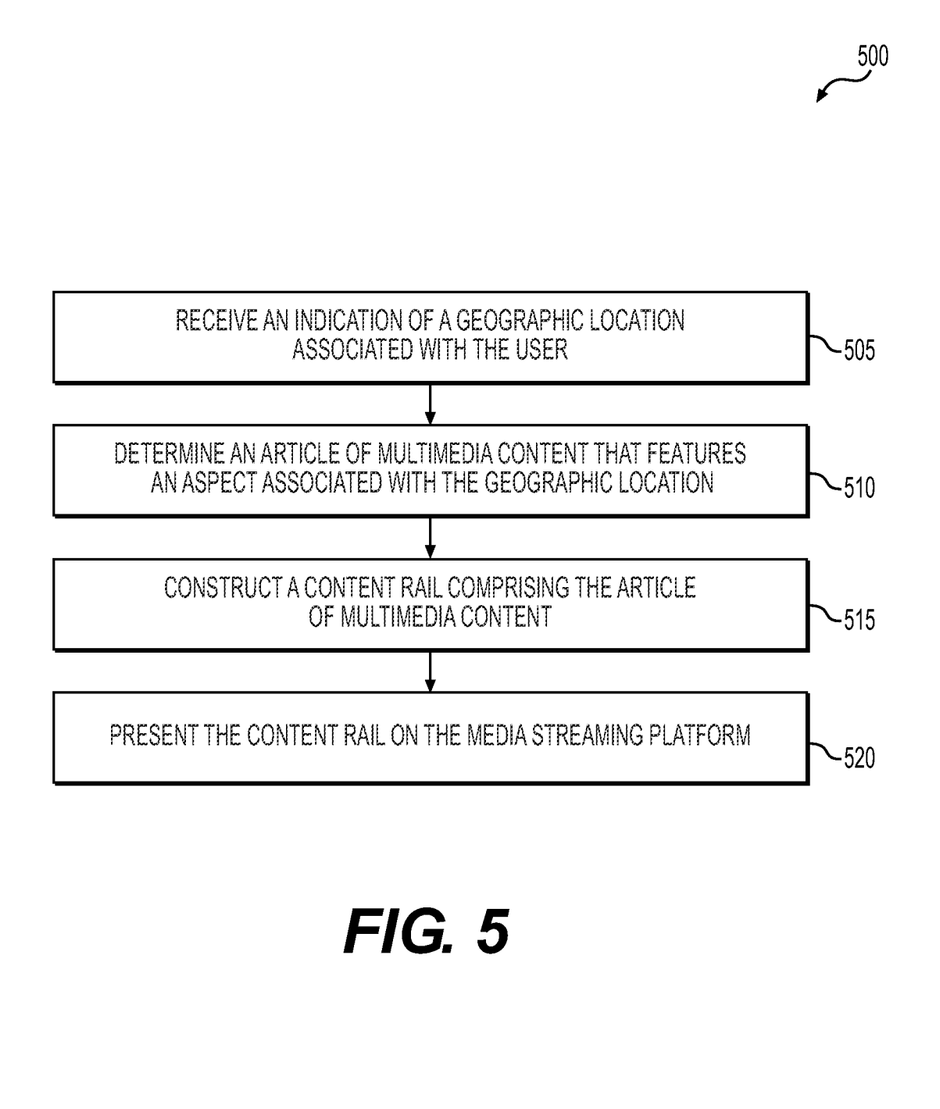
FIG. 5 depicts an exemplary flowchart of a method of constructing and presenting a location-based content rail, according to one or more embodiments.

Referring now to FIG. 5, a process flow 500 is depicted for presenting a content rail to a user that comprises geographically-relevant articles of multimedia content. The exemplary process flow 500 may be implemented by system environment 100, which includes user computing device 105, computer server 115, multimedia content preference database 120, and content delivery databases 125 (all shown in FIG. 1).

At step 505, the computer server 115 may receive an indication of a geographic location associated with a user. In the context of this application, the user's geographic location may correspond to virtually any physical position located in the real world. In an embodiment, the geographic location of the user may be deduced from location data associated with a user's computing device 105. More particularly, the computer server 115 may assume that the user's geographic position is substantially equivalent to the geographic position of their computing device 105. In an embodiment, geographic location data may be received from the computing device 105 (e.g., substantially continuously, at predetermined intervals, etc.), which may be derived from one or more location-aware technologies including, but not limited to, GPS, Wi-Fi triangulation, Enhanced Observed time Difference (E-OTD), and the like. Additionally or alternatively, in another embodiment, the geographic location of the user may be deduced from receipt of location-based context data associated with the user. More particularly, the computer server 115, given appropriate permissions, may be capable of accessing one or more of a user's calendar data (e.g., containing stored indications of designated locations a user will be located), communication data (e.g., emails, SMS messages, online chat data, etc.), and/or social media data (e.g., status updates, public posts, etc.).

At step 510, the computer server 115 may determine at least one article of multimedia content present on the media streaming platform that features an aspect associated with the geographic location. In the context of this application, the article of multimedia content may be one or more of: an entire series, an episode in a series, a film, a documentary, a live broadcast, and/or virtually any other type of visual media that is able to be broadcast on the media streaming platform. In the context of this application, an aspect of the article of multimedia content that is associated with the geographic location of the user may correspond to one or more of: a location, a building, a structure, and/or an object featured in the article of multimedia content that is located, filmed at, and/or is referenced as being associated with the user's geographic location. In an embodiment, the computer server 115 may facilitate this determination by, for example, first obtaining geographic information for each aspect present in an article of multimedia content available on the media streaming platform (e.g., via accessing a database that contains these geographic associations, by obtaining these geographic associations from an online source, etc.) and thereafter comparing it to the geographic location associated with the user.

At step 515, the computer server 115 may construct a content rail that comprises at least one of the geographically-associated articles of multimedia content determined in step 510 and may thereafter present, at step 520, the content rail on the media streaming platform. In the context of this application, a content rail may correspond to an organized listing of multimedia articles that a user may choose from. In an embodiment, the content rail may comprise a combination of all types of multimedia articles (e.g., shows, movies, documentaries, etc.). As an example of the foregoing and with reference to FIG. 6, an illustrative example of a location-based content rail is provided, according to one or more embodiments. More particularly, a GUI 600 of a media streaming platform is illustrated that may provide a content rail 605 that contains content recommendations 610 that are all associated in some way with the user's geographic location (e.g., articles of multimedia content that may have been filmed at the user's geographic location, articles of multimedia content that may have been based on the user's geographic location, articles of multimedia content that may contain topics related to the user's geographic location, articles of multimedia content that may feature an object or structure associated with the user's geographic location, etc.).

Figure 6:
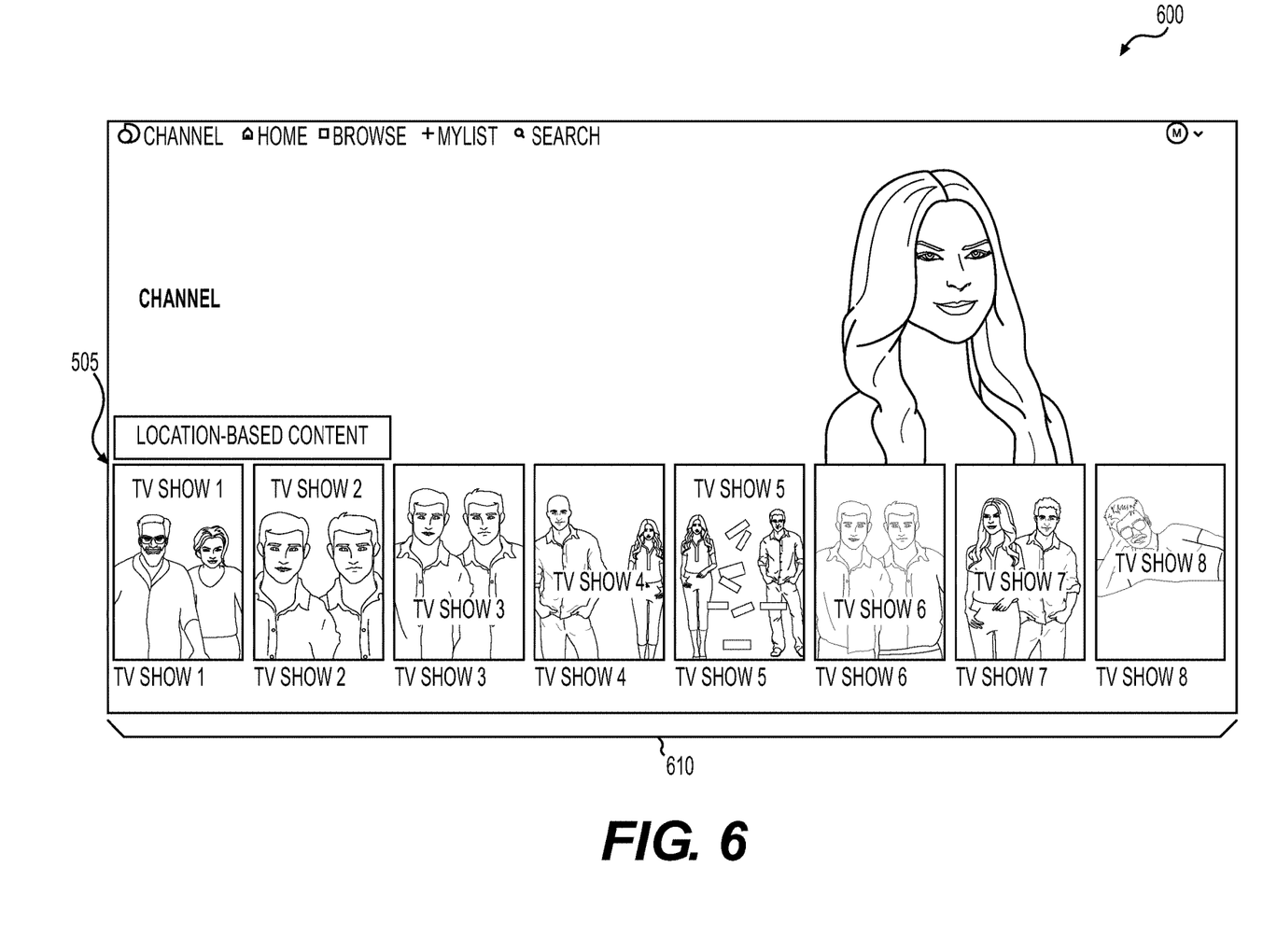
FIG. 6 depicts an exemplary GUI of a media streaming platform, according to one or more embodiments.

In an embodiment, additional dynamic changes may be made to the media streaming platform based on social, environmental, and/or geographic characteristics associated with the user's current geographic location. For example, a color palette of the media streaming platform may be dynamically adjusted to match a color scheme customarily associated with the user's geographic location (e.g., the colors showcased by a popular local sports team, the colors exhibited by the natural environment associated with the geographic location, etc.). In another example, words and/or phrases utilized on the media-streaming platform may be dynamically adjusted to match common regional words and/or colloquialisms associated with the user's geographic location. In yet another example, if the media streaming platform supports advertisements (e.g., banner advertisements, embedded video advertisements, etc.), then those advertisements may be refined to showcase regional advertisements that may be more relevant to the user in the moment (e.g., advertisements for deals associated with local restaurants, stores, etc.). In yet another example, the media streaming platform may act as an activity recommendation center that may identify one or more activities and/or events that a user may participate in at their geographic location and provide an indication of these activities and/or events to the user.

In general, any process discussed in this disclosure that is understood to be computer-implementable, such as the processes illustrated in FIGS. 2 and 5, may be performed by one or more processors of a computer server, such as computer server 115, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer server. A processor may be a central processing unit (CPU), a graphics processing unit (GPU), or any suitable types of processing unit.

A computer system, such as computer server 115, may include one or more computing devices. If the one or more processors of the computer system are implemented as a plurality of processors, the plurality of processors may be included in a single computing device or distributed among a plurality of computing devices. If a computer server 115 comprises a plurality of computing devices, the memory of the computer server 115 may include the respective memory of each computing device of the plurality of computing devices.

Figure 7:
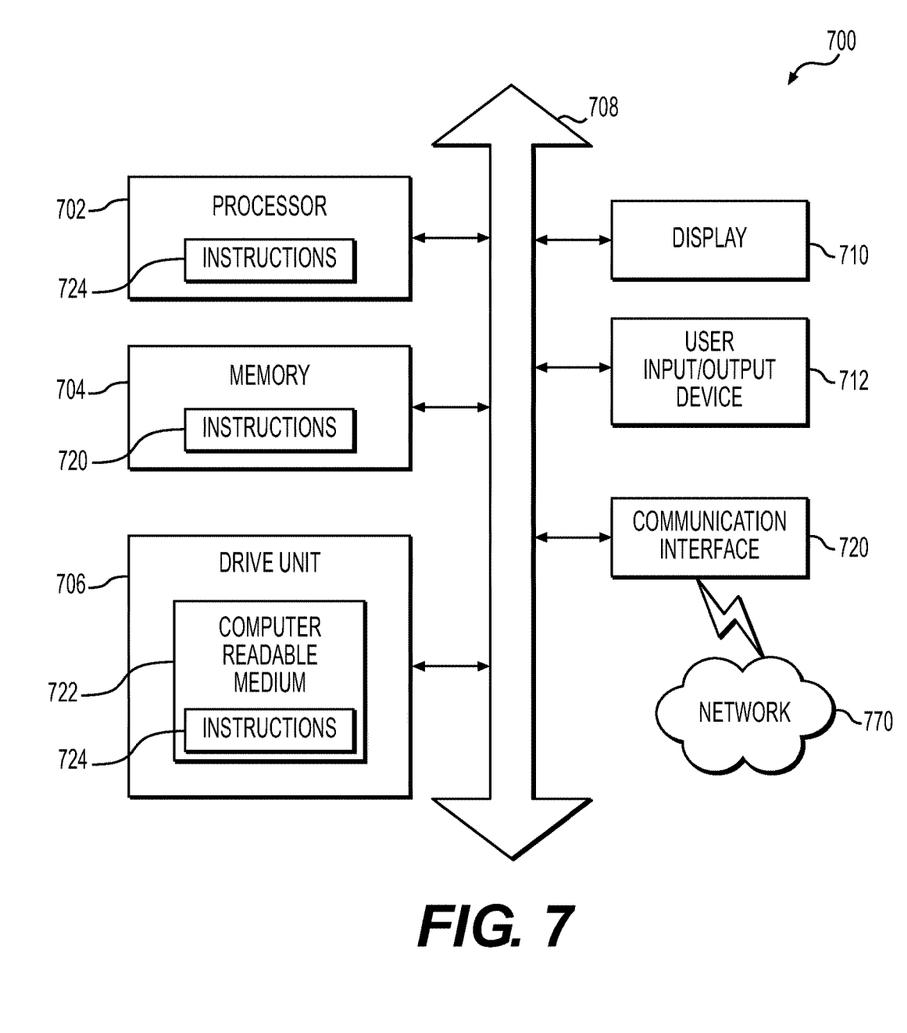
FIG. 7 depicts an exemplary computing server, according to one or more embodiments.

FIG. 7 is a simplified functional block diagram of a computer system 700 that may be configured as a computing device for executing the processes illustrated in FIGS. 2 and 5, according to exemplary embodiments of the present disclosure. FIG. 7 is a simplified functional block diagram of a computer that may be configured as the computer server 115 according to exemplary embodiments of the present disclosure. In various embodiments, any of the systems herein may be an assembly of hardware including, for example, a data communication interface 720 for packet data communication. The platform also may include a central processing unit ("CPU") 702, in the form of one or more processors, for executing program instructions. The platform may include an internal communication bus 808, and a storage unit 706 (such as ROM, HDD, SDD, etc.) that may store data on a computer readable medium 722, although the system 700 may receive programming and data via network communications. The system 700 may also have a memory 704 (such as RAM) storing instructions 724 for executing techniques presented herein, although the instructions 724 may be stored temporarily or permanently within other modules of system 700 (e.g., processor 702 and/or computer readable medium 722). The system 700 also may include input and output ports 712 and/or a display 710 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to asynchronous consumption of streaming media, it should be appreciated that the presently disclosed embodiments may be applicable to transmitting data and may be applicable to any environment, such as a desktop or laptop computer, a gaming console environment, and any CTV (connected TV) environment (e.g., an internet-connected device used to watch multimedia content items), etc. Also, the presently disclosed embodiments may be applicable to any type of Internet protocol.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

In general, any process discussed in this disclosure that is understood to be performable by a computer may be performed by one or more processors. Such processes include, but are not limited to: the process shown in FIG. 16, and the associated language of the specification. The one or more processors may be configured to perform such processes by having access to instructions (computer-readable code) that, when executed by the one or more processors, cause the one or more processors to perform the processes. The one or more processors may be part of a computer system (e.g., one of the computer systems discussed above) that further includes a memory storing the instructions. The instructions also may be stored on a non-transitory computer-readable medium. The non-transitory computer-readable medium may be separate from any processor. Examples of non-transitory computer-readable media include solid-state memories, optical media, and magnetic media.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method, the computer-implemented method comprising operations including:
   presenting, on a user device, a media streaming platform interface comprising a plurality of user-selectable articles of multimedia content;
   receiving, at a server associated with the media streaming platform interface, an indication of a geographic location associated with the user device of a user;
   identifying, using a processor associated with the server, a characteristic associated with the geographic location; and
   adjusting, using the processor and based on the identifying, a visual appearance of portions of the media streaming platform interface, separate from other portions of the media streaming platform interface that are utilized to present any of the plurality of user-selectable articles of multimedia content, to match a color scheme associated with the characteristic associated with the geographic location.

2. The computer-implemented method of claim 1, wherein the characteristic corresponds to one or more of: a social characteristic, an environmental characteristic, and a geographic characteristic.

3. The computer-implemented method of claim 1, wherein the adjusting comprises automatically adjusting without receiving manual user input.

4. The computer-implemented method of claim 1, wherein the adjusting the visual appearance comprises adjusting default words and/or default phrases presented on the portions of the media streaming platform interface to match regional words and/or regional phrases associated with the geographic location.

5. The computer-implemented method of claim 1, wherein the adjusting the visual appearance comprises displaying advertisements on the portions of the media streaming platform interface associated with regional businesses.

6. The computer-implemented method of claim 1, further comprising:
   identifying one or more available real-world activities in the geographic location;
   generating a notification containing information associated with the one or more real-world activities; and
   providing, via the media streaming platform interface, the notification to the user.

7. The computer-implemented method of claim 1, further comprising:
   determining, using the server, at least one article of multimedia content from the plurality of user-selectable articles of multimedia content that contains a feature associated with the geographic location;
   constructing, based on the determining, a content rail comprising the at least one article of multimedia content; and
   presenting, on the media streaming platform interface, the content rail.

8. The computer-implemented method of claim 7, wherein the feature of the at least one article of multimedia content corresponds to one or more of: a location where the article of multimedia content was filmed, a building featured in the article of multimedia content, and a structure featured in the article of multimedia content.

9. The computer-implemented method of claim 7, wherein the presenting the content rail comprises presenting in response to detecting selection of a travel mode option.

10. The computer-implemented method of claim 7, further comprising visually distinguishing the at least one article of multimedia content from another article of multimedia content from the plurality of user-selectable articles of multimedia content determined to not contain the feature.

11. A system for optimizing travel, the system comprising:
   a processor;
   a database; and
   a server in network communication with the database, the server configured to perform operations including:
      presenting, on a user device, a media streaming platform interface comprising a plurality of user-selectable articles of multimedia content;
      receiving, at the server, an indication of a geographic location associated with the user device of a user;
      identifying, using the processor, a characteristic associated with the geographic location; and
      adjusting, using the processor and based on the identifying, a visual appearance of portions of the media streaming platform interface, separate from other portions of the media streaming platform interface that are utilized to present any of the plurality of user-selectable articles of multimedia content, to match a color scheme associated with the characteristic associated with the geographic location.

12. The system of claim 11, wherein the adjusting comprises automatically adjusting without receiving manual user input.

13. The system of claim 11, wherein the adjusting the visual appearance comprises adjusting default words and/or default phrases presented on the portions of the media streaming platform interface to match regional words and/or regional phrases associated with the geographic location.

14. The system of claim 11, wherein the adjusting the visual appearance comprises displaying advertisements associated with regional businesses on the portions of the media streaming platform interface.

15. The system of claim 11, further comprising:
identifying one or more available real-world activities in the geographic location;
generating a notification containing information associated with the one or more real-world activities; and
providing, via the media streaming platform interface, the notification to the user.

16. The system of claim 11, further comprising:
determining, using the server, at least one article of multimedia content from the plurality of user-selectable articles of multimedia content that contains a feature associated with the geographic location;
constructing, based on the determining, a content rail comprising the at least one article of multimedia content; and
presenting, on the media streaming platform interface, the content rail.

17. The system of claim 16, wherein the feature of the at least one article of multimedia content corresponds to one or more of: a location where the article of multimedia content was filmed, a building featured in the article of multimedia content, and a structure featured in the article of multimedia content.

18. The system of claim 16, wherein the presenting the content rail comprises presenting in response to detecting selection of a travel mode option.

19. The computer system of claim 16, further comprising visually distinguishing the at least one article of multimedia content from another article of multimedia content from the plurality of user-selectable articles of multimedia content determined to not contain the feature.

20. A non-transitory computer-readable medium storing computer-executable instructions which, when executed by a server in network communication with at least one database, cause the server to perform operations comprising:
presenting, on a user device, a media streaming platform interface comprising a plurality of user-selectable articles of multimedia content;
receiving, at the server, an indication of a geographic location associated with the user device of a user;
identifying, using a processor associated with the server, a characteristic associated with the geographic location; and
adjusting, using the processor and based on the identifying, a visual appearance of portions of the media streaming platform interface, separate from other portions of the media streaming platform interface that are utilized to present any of the plurality of user-selectable articles of multimedia content, to match a color scheme associated with the characteristic associated with the geographic location.

* * * * *